(12) United States Patent
Tsiklios et al.

(10) Patent No.: US 12,348,039 B2
(45) Date of Patent: Jul. 1, 2025

(54) METHOD FOR ON-DEMAND CLOSED-LOOP CONTROL OF AN ELECTROCHEMICAL PLANT

(71) Applicant: THYSSENKRUPP NUCERA AG & CO. KGAA, Dortmund (DE)

(72) Inventors: Christos Tsiklios, Essen (DE); Corneila Buerkin, Dortmund (DE); Gregor Damian Polcyn, Dortmund (DE); Lukas Lueke, Dortmund (DE); Peter Toros, Essen (DE); Fulvio Federico, Piacenza (IT)

(73) Assignee: thyssenkrupp nucera AG & Co. KGaA, Dortmund (DE)

( * ) Notice: Subject to any disclaimer, the term of this patent is extended or adjusted under 35 U.S.C. 154(b) by 452 days.

(21) Appl. No.: 18/010,285

(22) PCT Filed: Jun. 2, 2021

(86) PCT No.: PCT/EP2021/064727
§ 371 (c)(1),
(2) Date: Dec. 14, 2022

(87) PCT Pub. No.: WO2021/254774
PCT Pub. Date: Dec. 23, 2021

(65) Prior Publication Data
US 2023/0246445 A1    Aug. 3, 2023

(30) Foreign Application Priority Data
Jun. 15, 2020    (DE) ..................... 10 2020 115 711.8

(51) Int. Cl.
*H02J 3/28*    (2006.01)
*C25B 15/02*    (2021.01)
(Continued)

(52) U.S. Cl.
CPC ............... *H02J 3/28* (2013.01); *C25B 15/02* (2013.01); *H02J 3/381* (2013.01); *H02J 15/008* (2020.01); *H02J 2300/28* (2020.01)

(58) Field of Classification Search
None
See application file for complete search history.

(56) References Cited

U.S. PATENT DOCUMENTS

| 8,981,683 B2 | 3/2015 | Hambitzer et al. |
| 9,638,160 B2 | 5/2017 | Spooner et al. |

(Continued)

FOREIGN PATENT DOCUMENTS

| CN | 110129832 A | * | 8/2019 | ............... C25C 3/20 |
| EP | 1 910 588 B1 | | 4/2008 | |

(Continued)

OTHER PUBLICATIONS

English Translation of International Search Report issued in PCT/EP2021/064727, dated Sep. 3, 2021.

*Primary Examiner* — Louis J Rufo
(74) *Attorney, Agent, or Firm* — thyssenkrupp North America, LLC

(57) ABSTRACT

Demand-based closed-loop control is used in an electrochemical plant that has modules and a control unit, with each module being individually controlled by the control unit and supplied with a module-specific electric operating current. For each module to generate a separate product flow, product flows of the individual modules, connected in parallel, are merged to form a total product flow. When a start condition occurs, the control unit records a current total product flow demand, records a current efficiency of the modules based on a ratio of respective operating current and product flow, determines operationally ready modules, determines module-specific target operating currents for the operationally ready modules to cover the demand from a range of per- (Continued)

missible module-specific target operating currents based on the efficiency of the modules and the demand, and sets the operating currents of the operationally ready modules to the determined module-specific target operating currents.

14 Claims, 4 Drawing Sheets

(51) Int. Cl.
    *H02J 3/38*      (2006.01)
    *H02J 15/00*      (2006.01)

(56) References Cited

U.S. PATENT DOCUMENTS

| | | |
|---|---|---|
| 2006/0289312 A1 | 12/2006 | Tremblay et al. |
| 2011/0254109 A1 | 10/2011 | Ossmann et al. |
| 2012/0175954 A1 | 7/2012 | Hinatsu et al. |
| 2014/0101492 A1* | 4/2014 | Langer .................. G06F 11/00 714/E11.144 |
| 2015/0127279 A1* | 5/2015 | Kiefer .................. G01R 31/378 702/63 |
| 2018/0291516 A1 | 10/2018 | Nakao |
| 2019/0127867 A1 | 5/2019 | Yonezawa et al. |

FOREIGN PATENT DOCUMENTS

| | | |
|---|---|---|
| EP | 2 350 352 B1 | 8/2011 |
| EP | 3 656 893 A1 | 5/2020 |
| FR | 2 960 560 A1 | 12/2011 |
| JP | 2005-126792 A | 5/2005 |
| JP | 2014-034726 A | 2/2014 |
| KR | 1020170013151 A | 2/2017 |
| KR | 1020170137784 A | 12/2017 |
| KR | 1020190077070 A | 7/2019 |
| KR | 102046045 A | 11/2019 |
| KR | 102351219 B1 | 1/2022 |
| RU | 2563576 C2 | 9/2015 |
| RU | 2547165 C2 | 10/2016 |
| RU | 2627035 C2 | 3/2017 |
| WO | 2014/024660 A1 | 2/2014 |

* cited by examiner

METHOD FOR ON-DEMAND CLOSED-LOOP CONTROL OF AN ELECTROCHEMICAL PLANT

CROSS REFERENCE TO RELATED APPLICATIONS

This application is a U.S. National Stage Entry of International Patent Application Serial Number PCT/EP2021/064727, filed Jun. 2, 2021, which claims priority to German Patent Application No. DE 10 2020 115 711.8, filed Jun. 15, 2020, the entire contents of both of which are incorporated herein by reference.

FIELD

The present disclosure generally relates to the operation of plants, including methods for demand-based closed-loop control of electrochemical plants.

BACKGROUND

The energy demand of chemical plants forms a significant portion of the energy demand of industry as a whole, so that there is a marked interest in reducing the energy requirements of chemical plants both for economic and ecological reasons.

One example of particularly energy-intensive plants reference is that of electrolysis plants, such as water electrolysis or chlorine-alkali electrolysis plants. At the core of such plants are cells connected in series, which form modules—also called stacks. Such a structure is also used in fuel-cell or battery technology. In typically large-scale chemical plants, a large number of such modules are operated in parallel in order to generate a desired total product flow, for example a material flow or electric current, i.e. to perform demand-based closed-loop control of the electrochemical plant. If the total product flow of the plant is to be met purely from renewable energy sources, it is necessary for the plant to be sufficiently flexible. A high degree of flexibility in the plant ensures that the widely varying power provided by renewable energy sources can be converted into a total product flow as comprehensively and quickly as possible. As a positive side effect, this flexible types of plant can also be used to buffer power peaks caused by strong wind or intense solar radiation in an efficient and practical way in order to maintain grid stability. In this respect, such plants are required both to be particularly energy-efficient and to be able to react as flexibly as possible.

Document EP 2 350 352 B1 discloses a power delivery system for the electrolytic production of hydrogen from wind power as well as a method for controlling the distribution of electrical energy from a wind farm to a plurality of electrolysis modules for hydrogen production. The control system used is designed to keep the module utilization rate as close as possible to the level of the electrical energy provided by the wind farm—which is particularly problematic in the event of widely fluctuating wind strength—and thus to use the highest possible proportion of renewable energy for the hydrogen production. For this purpose, the operating current of the module is selected on the basis of the available DC power generated by the wind farm in order to be able to invest the highest possible proportion of the wind energy into hydrogen production.

The disadvantage of such plants is that they are operated far from their optimum energy efficiency operating point, so that such existing plants have an increased total power consumption, which is neither economically nor ecologically sensible. In particular, in the case of systems known from the prior art or in the closed-loop control of such systems, the individual age characteristics and operating modes of the individual modules are ignored, although they have a considerable impact on the efficiency of the entire plant and thus on its overall power consumption.

US 2019/0127867 A1 and US 2018/0291516 A1 each describe an electrolytic system comprising a power generator that outputs a first DC power, a plurality of converters, each of which converts the first DC power into a second DC power according to a target duty cycle and outputs voltage information and current information about the second DC power, a plurality of electrolyzers, a control circuit, and a selection circuit. Each of the electrolyzers receives a second DC-current power that is output by the respectively assigned converter. The control circuit outputs control information by means of which the first DC-current power approaches a maximum power level, based on a voltage value and a current value of the first DC power. The selection circuit outputs the target duty cycle and a selection signal as to whether to select each of the plurality of electrolyzers and each of the plurality of the converters, based on the control information and the voltage and current information.

Thus a need exists for a method for the demand-based closed-loop control of an electrochemical plant, which method is characterized by the minimum possible total power consumption, the most economical and ecological operation possible, and a high degree of flexibility to cope with a widely fluctuating total product flow demand.

DETAILED DESCRIPTION

Figure 1:
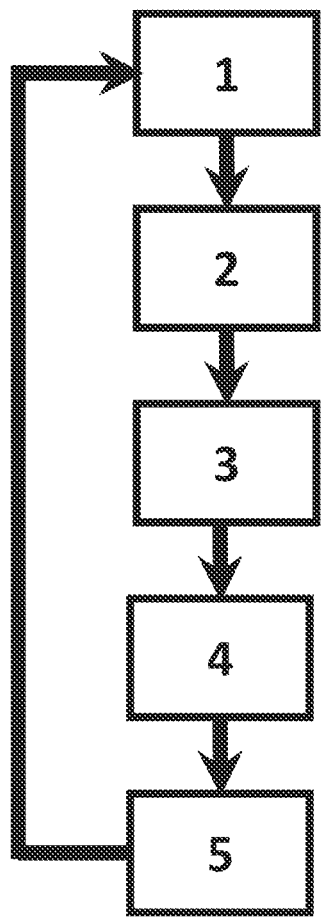
FIG. 1 is a flow diagram illustrating steps of an example method of the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

The present disclosure generally relates to methods for demand-based closed-loop control of an electrochemical plant. In some examples, the plant may include modules and a control unit, each module being controlled individually by the control unit and supplied with a module-specific electric operating current in order for each module to generate a separate product flow, the product flows of the individual modules, which are connected in parallel with regard to their product flows, being merged together to form one total product flow of the plant.

In some examples, a method may be involve the following steps carried out by a control unit when a start condition is satisfied:

recording a current total product flow demand recording the current efficiency of the modules of the electrochemical plant depending on the ratio of the respective operating current and product flow, determining the operationally ready modules, determining module-specific target operating currents for the operationally ready modules to cover the current total product flow demand from a range of permissible module-specific target operating currents as a function of the efficiency of the modules and the current total product flow demand, setting the operating currents of the operationally ready modules to the determined module-specific target operating currents.

It is a feature of the modules discussed in the context of this invention that they can be characterized in terms of their efficiency. Such modules can be, for example, electrolysis modules, the current-voltage characteristic of which represents a whole family of different operating points of the module. In addition, the aging process of the modules is also reflected in the current-voltage characteristic, since older and thus less energy-efficient modules require a higher voltage in order to supply the same current or product flow.

The essential feature of the method according to the invention is that the chemical plant to be closed-loop controlled based on demand comprises a control unit in addition to the individual modules, which unit is designed to activate the modules individually. This activation involves in particular the control unit supplying each module with a module-specific electric operating current. The plant is designed in such a way that the product flows of the individual modules in the plant are combined to form a total product flow.

Characteristic of the method according to the invention is that if a start condition is satisfied, the following steps are carried out by the control unit:

The current total product flow demand is recorded. This is necessary to the extent that the total product flow demand is to be met by the chemical plant.

In addition, the efficiency of each module is recorded. This represents an essential step in the method according to the invention in order to be able to closed-loop control the chemical plant as efficiently as possible. The module-specific efficiency depends on the ratio of the module-specific operating current and the respective generated product flow of the module. The efficiency of the modules is not constant, but depends, for example, on the aging of the module or also on the operating temperature.

In addition, as part of the method according to the invention, the available modules of the plant are recorded. In particular, it is also possible only to consider the operationally ready modules: modules that are defective or undergoing maintenance cannot contribute to the total product flow demand and are therefore ignored, so that the missing contributions of such modules must be compensated—if possible—by the operationally ready modules. Non-operationally ready modules are assigned the module-specific target operating current of essentially zero, so that such modules are effectively switched off. According to the invention, it may be provided that by identifying the modules, not only the modules as such but a total product flow capacity can be determined. Such information is valuable for performing closed-loop control of the plant, for example, for buffering an excess supply of energy, in particular renewable energy. As part of a preferred refinement, it may be provided that the individual modules will be operated with an overload, for example 110%, over a certain period of time in order to make a particularly high contribution to grid stability.

In a further step of the method according to the invention, the module-specific target operating currents are determined in order to meet the total product flow demand. This is determined on a module-specific basis—in other words, this method provides that each module is assigned an individual target operating current. The target operating currents are selected from a range of permissible module-specific target operating currents. The lower limit of such a range is given, for example, by the target operating current that is required to put the module into operation at all. An upper limit of the target operating current is given by, for example, a current at which the module operates at the limit of its maximum utilization without it incurring excessive damage, i.e. beyond the normal aging effects.

However, the module-specific target operating currents are not determined solely on the basis that the permissible range of target operating currents is maintained and the total product flow demand is met. Instead, the module-specific target operating currents are determined as a function of the efficiency of the modules and the current total product flow demand. While the dependency of the target operating currents on the total product flow demand is simply due to the fact that there is a direct dependency between supplying the modules with a certain target operating current and the total product flow generated—and therefore the target operating currents must always be determined with regard to the total product flow demand—the dependency of the target operating currents of the modules on the efficiency of the modules represents a non-trivial dependency. This consideration of the efficiency of the modules in the determination of the target operating currents makes it possible in a particularly advantageous way to operate the plant in an energy-efficient mode.

After the operating currents of the modules have been set to the determined module-specific target operating currents to meet the total product flow demand in an energy-efficient way, the method according to the invention can start again from the beginning, for example by the control unit monitoring the plant for the presence of a new start condition.

The method according to the invention thus not only enables energy-efficient operation, but the demand-based closed-loop control of the electrochemical plant to meet a total product flow demand also makes a major contribution to grid stability, since voltage and/or current peaks due to an excess supply of energy, in particular energy obtained from renewable sources, can be buffered by selecting the total product flow or the total product flow demand generated by the method according to the invention in such a way that a specific amount of electrical energy, in particular energy to be buffered, is used for this purpose.

In a refinement of this method according to the invention, in order to determine the module-specific target operating currents the respective modules are sorted according to their current efficiency levels and are raised or lowered according to that order until the current total product flow demand is met. As a result, in the event of increasing or decreasing total product flow demand, the most efficient or least efficient modules are supplied with a higher or lower target operating current. This ensures that such modules, which are currently characterized by a particularly high efficiency, are operated with a high utilization rate or target operating current and inefficient modules are operated with a low utilization rate or target operating current.

The ordering or sorting of the modules according to their efficiency for the ordered raising or lowering of the module-specific target operating currents can be very time-consuming, so that the flexibility with regard to meeting a widely fluctuating total product flow demand can no longer be guaranteed. This problem can be addressed by means of a preferred refinement according to the invention by minimizing the time required to sort n modules by using an algorithm that scales according to $n*\log(n)$. For example, the so-called Quicksort algorithm can be used as the sorting algorithm, which scales as stated above and allows the method according to the invention to react sufficiently quickly to a change in the total product flow demand, even when applied to plants with a large number of modules.

To determine the module-specific target operating currents (Im) the respective modules (M) are sorted according to a module-specific life-cycle parameter and are raised or lowered according to that order until the current value of the total product flow demand (B) is met. The life-cycle parameter is calculated from the current efficiency of the modules and a correction term that takes into account maintenance costs of the electrochemical plant. By taking into account the maintenance costs, the operation of the plant is improved with regard to the total cost of the operation (Total Cost of Ownership). The correction term generates a deviation from the currently most efficient operating point of the plant, which allows non-uniform aging of the modules in terms of their efficiency. The maintenance costs of the plant depend on the mode of operation of the plant. For example, the maintenance costs can be reduced by only needing to inspect the plant at specified maintenance intervals and avoiding downtimes or shutdowns. In order to reduce maintenance costs, it is therefore advantageous to maintain or replace a portion of the modules, for example 10% to 25% of the modules, on a rolling basis after a maintenance interval has expired and while the plant is running. For this purpose, it is advantageous if the modules to be replaced exhibit a higher degree of aging and thus a lower efficiency than the other modules of the plant. It is also advantageous to ensure, after the maintenance or replacement, that not only the most recently maintained modules are used in part-loaded operation due to their higher efficiency. These advantages are achieved by a correction term that takes into account the maintenance costs of the plant.

The correction term is preferably determined depending on a total charge quantity that flowed through the respective module during the previous life-cycle and/or depending on the age of the respective module and/or depending on the position of the module in the electrochemical plant. Different aging processes are active in the electrochemical cells of the modules, the progression of which requires maintenance or replacement at a certain point in time. A group of aging effects depends primarily on the total amount of charge that has flowed through the module. These include, for example, the decreasing ion conductivity of separators and the quality of electrode coatings. Other aging effects, for example corrosive effects, depend primarily on the age of the module. By taking into account the position of the module in the electrochemical plant, it is also possible to control the degree to which the modules to be maintained or replaced are as spatially concentrated as possible, e.g. in a block or sector of the plant. In this way, the maintenance costs can be further reduced.

The module-specific target operating currents for the operationally ready modules for meeting the total product flow demand are preferably determined iteratively, using a predictive calculation of the efficiency achievable for each individual module and assuming a stepwise change of the respective module-specific operating current. Iterative methods are well suited for optimizing complex plants under changing operating conditions, since they allow a fast and effective adaptation to changed conditions starting from a current operating state.

The iteration is preferably based on a greedy algorithm, i.e. an algorithm that incrementally selects the next state in the sequence that promises the best change in the efficiency of the plant at the time of the selection.

The iteration is preferably carried out with an adaptive step size which is selected depending on a current deviation of the total product flow from the total product flow demand. This allows the final state achievable with the iteration to be improved with respect to a theoretical optimum.

In a preferred refinement, in determining the module-specific target operating currents the efficiency of the modules is weighted with a weighting factor which depends on the ratio of the module-specific operating current and the sum of the module-specific operating currents of all modules. This makes it possible to operate the chemical plant even closer to its optimum energy efficiency, since the effect of the efficiency change of the individual module on the overall efficiency is taken into account.

In the practical operation of the chemical plant, in accordance with a refinement of the method according to the invention, the focus is not only on good energy efficiency but also on being able to handle large fluctuations in the total product flow demand sufficiently quickly; thus, an ability to adapt the utilization rate of the plant to a widely varying demand with sufficient flexibility. This is achieved as part of a refinement of the method according to the invention by all modules being assigned a minimum operating current corresponding to a basic load by means of the control unit. A minimum operating current ensures, among other things, that all modules, such as modules of an electrolysis plant, are kept at a minimum temperature, which enables all of the modules to have a certain minimum efficiency. Otherwise, cold electrolysis modules might not be considered by the control unit due to their low efficiency, with the result that the total product flow demand may not be met.

In a preferred embodiment of the method according to the invention, the control unit is a plant control unit. For safety reasons alone, such a plant control unit is required for almost all chemical plants anyway, which means that no additional control hardware is required in order to carry out the method according to the invention. In addition to the advantages described above with regard to the energy-efficient operation of the plant, this makes the use of the method according to the invention particularly attractive in a wide range of chemical plants.

The method steps according to the invention are not carried out until a start condition is satisfied. Such a start condition can be the fact that the product flow that is currently being generated deviates from the total product flow demand by a predefinable amount. Such a start condition will cover both a fluctuating efficiency of the modules, which leads to a varying total product flow, as well as a varying total product flow demand. The commissioning or decommissioning of individual modules can also be considered as a possible start condition. For example, if individual modules are taken out of service for maintenance purposes, these modules will no longer be available for meeting the total product flow demand. By providing an above-described start condition, the method according to the invention will treat a module that has been taken out of service as not operationally ready, so that the contribution of the module that has been taken out of service is delivered by another module. The same applies to additional modules that have been commissioned, for example, when the system is equipped with new modules.

In a further embodiment of the method according to the invention, the exceeding or undershooting of the temperature of the modules, determined by the control unit, by a predefinable maximum amount is used as a start condition. This means that the method according to the invention can prevent individual modules from overheating, or prevent modules from operating at a lower temperature than the desired operating temperature and thus not providing the best possible efficiency. The expiry of a specified period of time can also be provided as a particularly simple start condition.

In a particularly preferred refinement of the method according to the invention the electrochemical plant is a water-electrolysis plant. Since energy efficiency plays a particularly important role in a water-electrolysis plant and the different modules can sometimes show enormous differences and fluctuations in efficiency, the advantages of the method according to the invention, when applied to a water-electrolysis plant, can be particularly pronounced.

As part of a further embodiment of the method according to the invention, the efficiency of the individual modules can be determined on the basis of a current-voltage characteristic. This can be the case, for example, for electrolysis modules or also for batteries. The higher the efficiency of such electrolysis or battery modules, the lower the operating voltage at a particular target operating current. Aging of the modules is manifested, for example, in the fact that the current-voltage characteristic shifts toward higher voltages along the ordinate.

In a preferred refinement of the method according to the invention the efficiency of the individual modules is stored in the control unit as documentation of the aging of the modules. This results in the advantage that the module aging is continuously logged and the procurement of new modules or the re-conditioning of old modules can be initiated in a timely manner. This effectively prevents module failures and inefficient operation of modules subject to excessive aging. In addition, such a storage function makes it particularly simple to assign the latest stored efficiency value to cold and therefore inefficient modules, so that a more realistic value for the efficiency of the modules is assumed, taking into account the temperature dependence of the electrochemical reaction, than would be the case if the efficiency of the cold modules were to be used.

Preferably, the measured efficiencies in the control unit are added as data points to a module-specific model for predicting the current current-voltage characteristic of the respective module. The addition of data points updates the model as the module ages. A model for predicting the current current-voltage characteristic allows the prediction and consideration of the efficiency of the respective module at any operating point.

In another preferred embodiment of the method according to the invention, specific modules are powered for a predetermined time with a predetermined balancing operating current to improve the efficiency of the operationally ready modules, and this improvement is taken into account in determining the module-specific target operating currents. This balancing operating current allows the individual efficiency of the modules to be determined more accurately, further improving the accuracy of the method.

The method according to the invention for the demand-based closed-loop control of an electrochemical plant can be applied to plants that comprise modules and a control unit. Each module is individually controlled by the control unit and supplied with a module-specific electrical operating current. A product flow is generated by supplying the modules with an electric operating current. Such a product flow may contain, for example, chlorine and caustic soda in the case of chlorine-alkali electrolysis, or hydrogen in the case of water electrolysis. If the plant is in the form of a battery, the product flow is simply an electric current. In either case, the product flows generated by the individual modules are combined to form a total flow.

In FIG. 1, the essential method steps performed by the control unit are visualized schematically. If a start condition is satisfied, these include:

recording a current total product flow demand (1). The current total product flow demand can vary greatly. Extremely large fluctuations in the total product flow demand are possible, particularly in batteries.

As soon as the total product flow demand is recorded, the efficiency of the modules of the electrochemical plant is recorded (2). The efficiency depends on the ratio of the respective operating current and the product flow.

In a further step, the modules are identified (3), in particular which modules are actually available. Optionally, the operationally ready modules can also be identified: modules that are not operationally ready are, for example, those that are defective or taken out of service for maintenance purposes. Non-operational modules can also be assigned a fixed operating current of essentially zero, for example, for the duration of the fault or the maintenance activities.

The following method step according to the invention relates to the determination of module-specific target operating currents for the modules to meet the current total product flow demand. The module-specific target operating currents are determined from a range of permissible module-specific target operating currents, which, for example, can prevent damage being caused to the module by selecting an excessively high operating current. Instead, the module-specific target operating currents are determined as a function of the efficiency of the modules and the current total product flow demand (4). The consideration of the efficiency of the modules is an essential step of the method according to the invention, since this enables the operation of the chemical plant close to the minimized total power consumption point.

After the module-specific target operating currents have been determined, the operating currents of the modules are set to the determined module-specific target operating currents (5).

Figure 2:
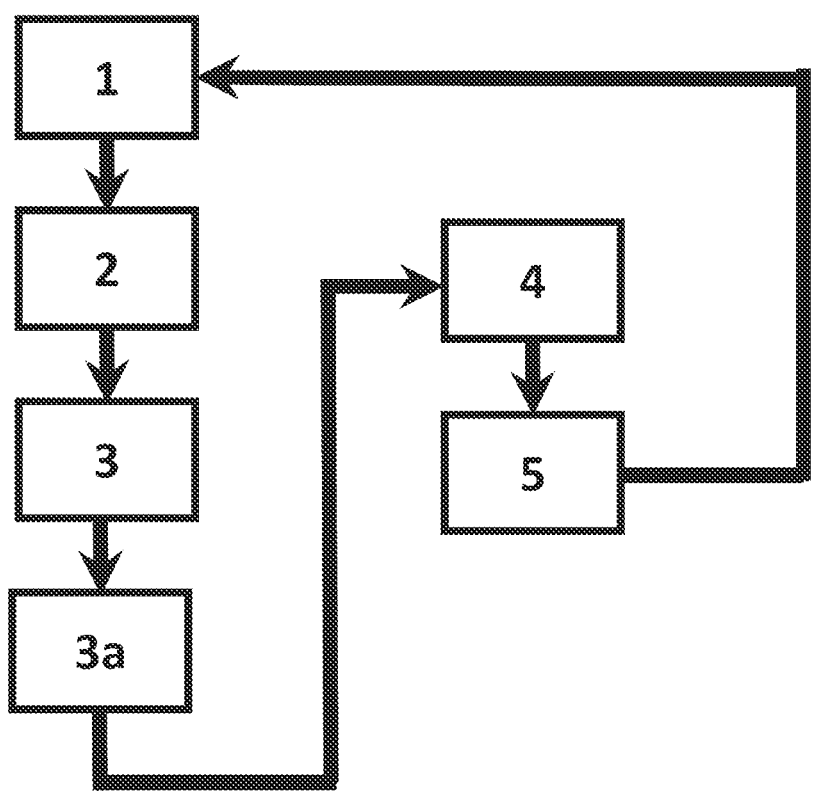
FIG. 2 is a flow diagram illustrating steps of another example method of the present disclosure, in which modules are sorted according to their current efficiency and are raised or lowered according to that order.

A preferred refinement of the method according to the invention is shown schematically in FIG. 2. This refinement is characterized in that, to determine the module-specific target operating currents the respective modules are sorted according to their current efficiency and are raised or lowered according to that order until the current total product flow demand is met (3a). In this way, the power consumption of the plant can be reduced in the event of an increasing or decreasing total product flow demand by assigning a higher or lower operating current to efficient or inefficient modules respectively. The sorting of the modules in terms of efficiency is necessary in order to be able to raise or lower them according to that order, subsequently. Since this sorting can involve a considerable amount of computing effort or time, a refinement of the method according to the invention provides that to sort the n modules with regard to their efficiency, an algorithm is used which scales with n*log(n), thus ensuring a manageable computing time even for large plants with large numbers of modules. This can be the Quicksort algorithm, for example.

According to the present disclosure—also shown in the method diagram according to FIG. 2—to determine the module-specific target operating currents in step (3a) the respective modules are sorted according to a module-specific life-cycle parameter and are raised or lowered according to that order until the current total product flow demand is met. The life-cycle parameter is calculated from the current efficiency of the modules (M) and a correction term that takes into account maintenance costs of the electrochemical plant. The correction term is preferably determined depending on a total charge quantity that flowed through the respective module during the previous life-cycle and/or depending on the age of the respective module and/or depending on the position of the module in the electrochemical plant.

The module-specific target operating currents ($I_m$) for the operationally ready modules (M) for meeting the total product flow demand (B) in the above-described methods are preferably determined iteratively, using a predictive calculation of the efficiency achievable for each individual module (M) and assuming a gradual change of the respective module-specific operating current. Greedy algorithms are particularly preferably used for the iteration. The iteration is preferably carried out with an adaptive step size, which is selected as a function of a current deviation of the total product flow from the total product flow demand (B).

When determining the module-specific target operating currents ($I_m$), the efficiency of the modules (M) is preferably weighted with a weighting factor that depends on the ratio of the module-specific operating current and the sum of the module-specific operating currents of all modules (M). This means that the effect of the efficiency change of the individual module on the overall efficiency is already taken into account when determining the module-specific target operating currents ($I_m$).

Figure 3:
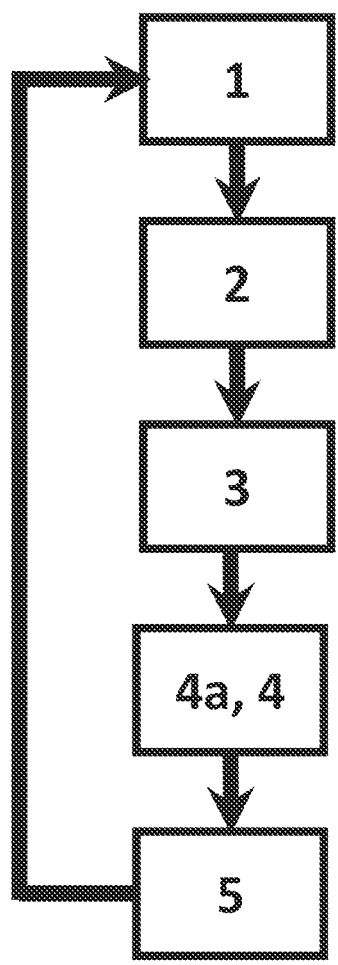
FIG. 3 is a flow diagram illustrating still another example method of the present disclosure, in which a determined module-specific target operating current is modified by multiplication with a weighting factor.

A preferred alternative refinement of the method according to the invention is shown in FIG. 3. In this case, the determined module-specific target operating current is modified by multiplication by a weighting factor which depends on the ratio of the module-specific operating current and the sum of the module-specific operating currents of all modules (4a). This brings the operating point of the plant even closer to its optimum energy efficiency.

Figure 4:
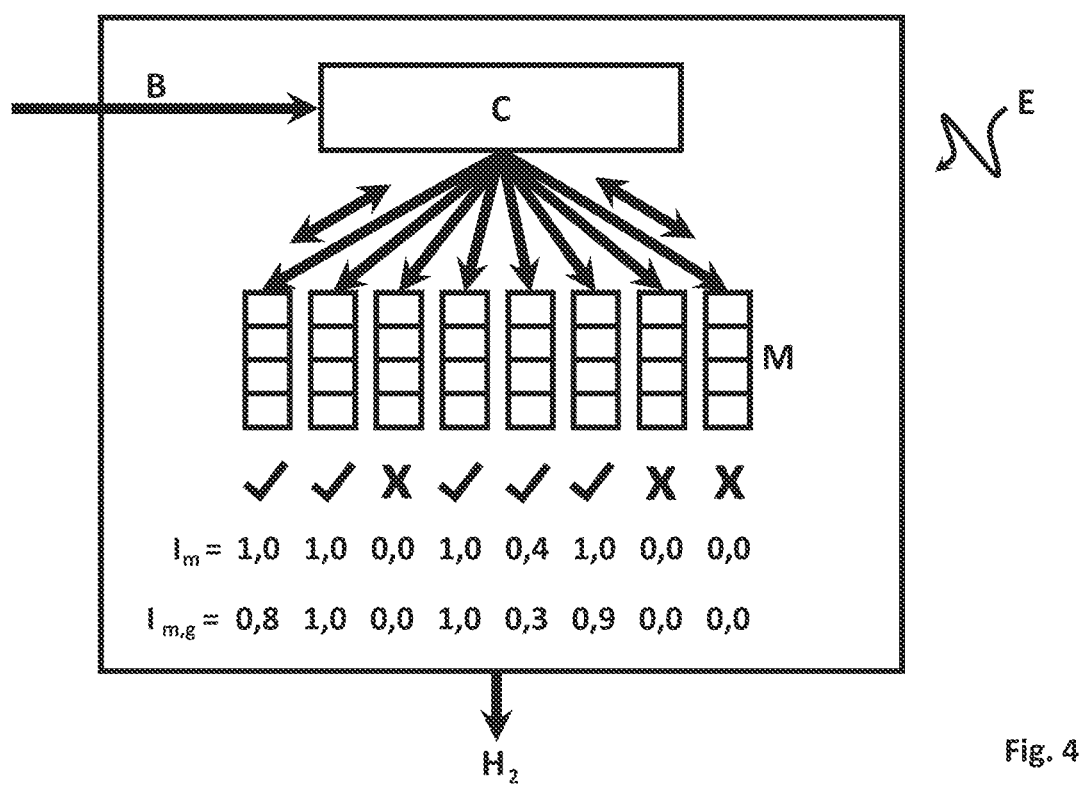
FIG. 4 is a schematic view representing an example method based on a water-electrolysis plant, which comprises a control unit and a plurality of modules connected in parallel, the modules being formed from electrolysis cells connected in series.

FIG. 4 illustrates a schematic representation of the method according to the invention based on a water-electrolysis plant (E), which comprises a control unit (C) and a plurality of modules (M) connected in parallel, which modules (M) are formed from electrolysis cells connected in series for producing hydrogen. The control unit (C) records the total product flow demand (B) and records the efficiency of the individual modules (M), sorts them according to their efficiency and determines the operational readiness of the modules (M) (indicated by a tick or a cross). The target operating currents of the modules ($I_m$) are then determined, multiplied by a weighting factor, so that the weighted target operating currents of the modules ($I_{m,g}$) are obtained in order to bring the entire plant closer to its most energy-efficient operating point. After setting the operating currents to the weighted target operating currents ($I_{m,g}$), the control unit can monitor the system for the presence of a new start condition.

LIST OF REFERENCE SIGNS

1 Recording the current total product flow demand
2 Recording the module efficiency
3 Identifying the modules
3a Sorting and variation according to efficiency/life-cycle parameters
4a Multiplication of the module-specific target operating currents with weighting factor
4 Determining the module-specific target operating currents
5 Setting the module-specific target operating currents
B Total product flow demand
C Control unit
E Water electrolysis plant
M Module
$I_m$ Target operating current of a module
$I_{m,g}$ Target operating current of a module after weighting

What is claimed is:

1. A method for demand-based closed-loop control of an electrochemical plant that comprises modules and a control unit, each module being individually controlled by the control unit and supplied with a module-specific electric operating current, wherein for each of the modules to generate a separate product flow, the product flows of the individual modules, which are connected in parallel with regard to their product flows, are merged to form a total product flow of the plant, wherein the following steps are performed by the control unit when a start condition is satisfied:
  recording a current total product flow demand;
  recording a current efficiency of the modules depending on a ratio of the respective operating current and product flow;
  determining operationally ready modules;
  determining module-specific target operating currents for the operationally ready modules to cover the current total product flow demand from a range of permissible module-specific target operating currents as a function of the efficiency of the modules and the current total product flow demand, wherein to determine the module-specific target operating currents, the respective modules are sorted according to a module-specific life-cycle parameter and are raised or lowered according to that order until the current total product flow demand is met; and
  setting the operating currents of the operationally ready modules to the module-specific target operating currents that have been determined,
  wherein the life-cycle parameter is calculated from the current efficiency of the modules and a correction term that accounts for maintenance costs of the electrochemical plant, wherein the correction term generates a deviation from a currently most efficient operating point of the plant, which allows non-uniform aging of the modules in terms of their efficiency.

2. The method of claim 1 comprising determining the correction term based on a total charge quantity that flowed through the respective module during a previous life cycle, based on an age of the respective module, and/or based on a position of the module in the electrochemical plant.

3. The method of claim 1 comprising determining iteratively the module-specific target operating currents for the operationally ready modules to meet the total product flow demand using a predictive calculation of the efficiency achievable for each individual module and assuming a stepwise change of the respective module-specific operating current.

4. The method of claim 3 wherein the iteration is based on a greedy algorithm.

5. The method of claim 3 wherein the iteration is performed with an adaptive step size that is selected depending on a current deviation of the total product flow from the total product flow demand.

6. The method of claim 1 wherein the efficiency of the modules when determining the module-specific target operating currents is weighted with a weighting factor that depends on a ratio of the module-specific operating current and a sum of the module-specific operating currents of all of the modules.

7. The method of claim 1 comprising assigning all of the modules a minimum operating current corresponding to a basic load by the control unit.

8. The method of claim 1 wherein the control unit is a plant monitoring unit.

9. The method of claim 1 wherein a predefinable amount of deviation of the currently generated product flow from the total product flow demand is used as the start condition.

10. The method of claim 1 wherein the commissioning or decommissioning of individual modules is used as the start condition.

11. The method of claim 1 wherein exceeding or undershooting a temperature of the modules, determined by the control unit, by a predefinable maximum amount is used as the start condition.

12. The method of claim 1 wherein the electrochemical plant is a water electrolysis plant.

13. The method of claim 1 wherein the efficiency of the individual modules is determined based on a current-voltage characteristic.

14. The method of claim 1 wherein the efficiency of the individual modules in the control unit is stored as documentation of module aging.

* * * * *